United States Patent [19]
Lyon et al.

[11] Patent Number: 6,151,299
[45] Date of Patent: Nov. 21, 2000

[54] METHOD AND APPARATUS FOR ENHANCED PARTIAL PACKET DISCARD

[75] Inventors: Norman Allan Lyon, Colibri Hull; Gregory Lloyd King, Nepean; Ra'ed Yousif Awdeh, Ottawa, all of Canada

[73] Assignee: Nortel Networks Corporation, Canada

[21] Appl. No.: 08/898,463

[22] Filed: Jul. 24, 1997

[51] Int. Cl.[7] ................................................. H04L 12/56
[52] U.S. Cl. .......................................... 370/229; 370/395
[58] Field of Search ..................................... 370/230, 231, 370/235, 229, 252, 253, 395, 412, 428, 429, 471, 473, 474, 394, 236, 389, 238, 413, 414, 415, 416, 417, 418

[56] References Cited

U.S. PATENT DOCUMENTS

| | | | |
|---|---|---|---|
| 5,335,224 | 8/1994 | Cole et al. | 370/235 |
| 5,404,354 | 4/1995 | Hayter et al. | 370/230 |
| 5,729,530 | 3/1998 | Kawaguchi et al. | 370/236 |
| 5,764,641 | 6/1998 | Lin | 370/412 |

OTHER PUBLICATIONS

"Dynamics of TCP Traffic over ATM Networks," Allyn Romanow and Sally Floyd, 8 pages (undated).
"Fairisle: An ATM Network for the Loacal Area," Ian Leslie and Derek McAuley, pp. 327–336, 1991.
"New Per–Flow Queuing Provides True Quality of Service for TCP/IP," 3 pages, May 27, 1997.
"New Per–Flow Queuing Provides True Quality of Service for TCP/IP," 5 pages, May 27, 1997.

*Primary Examiner*—Dang Ton
*Attorney, Agent, or Firm*—Finnegan, Henderson, Farabow, Garrett & Dunner, L.L.P.

[57] ABSTRACT

In an enhanced partial packet discard (PPD) methodology, if an end-of-packet cell is discarded for non-PPD reasons, all non-end-of-packet cells of the immediately following packet are discarded. When an end-of-packet cell may validly be discarded, a switch faced with an end-of-packet cell may discard that cell if the last cell admitted to the buffer was an end-of-packet cell. To reduce the likelihood of having to drop end-of-packet cells, a buffer is configured to include a partial packet discard threshold such that the buffer space between that threshold and the end of the buffer is reserved for use by end-of-packet cells.

21 Claims, 5 Drawing Sheets

METHOD AND APPARATUS FOR ENHANCED PARTIAL PACKET DISCARD

BACKGROUND OF THE INVENTION

The present invention relates to congestion control in a communications network and, more particularly, to congestion control in an asynchronous transfer mode (ATM) network through enhanced partial packet discard. One method of congestion control known in the art is referred to as partial packet discard (PPD). In the most basic form of PPD, once an ATM switch has dropped a cell of a packet from a connection, the switch should continue dropping cells for that connection up to, but excluding, the end-of-packet (EOP) cell, which is the last cell of the packet. The theory is that once any cell of a packet has been discarded, the balance of the cells in that packet are useless since ATM Adaptation Layer #5 (AAL5), the AAL commonly used for data traffic, is unable to reconstruct the packet. There is no point in transmitting the remaining cells in a packet when an ATM switch has knowingly discarded one cell in that packet, and doing so would only further contribute to network congestion.

Little has been written about PPD since introduction of a different more effective congestion control scheme known as early packet discard (EPD). However, the combination of EPD and PPD may offer the best performance, so some relevance to improving PPD remains. Most current interest in PPD assumes that only the EOP cell of a packet, the cell marked by AAL5 during the translation between packets and cells, is identifiable. Many of the issues with PPD design hinge on the assumption that the receiver has an overall integrity check on the packet (e.g., CRC in the case of AAL5) and cannot identify a whole packet after it has been spliced with other data, which is what would happen if an EOP cell were dropped.

Artisans using conventional PPD disagree over the proper treatment of EOP cells. While some counsel a safe approach—the unconditional admittance of EOP cells, others support the opposite train of thought—that EOP cells can always be dropped. Both approaches, however, have attendant disadvantages. Despite the unquestionable safety of the former approach, it is not optimal since the presence of EOP cells contributes to the amount of network traffic. The latter strategy, always dropping the EOP cells, is worse since it causes the subsequent packet to be discarded at the AAL receiver.

It is, therefore, desirable to provide an improved partial packet discard strategy which accomodates both admitting and discarding EOP cells. It is even more desirable to improve network performance through an enhanced partial packet discard congestion control by identifying situations in which an EOP cell can be dropped, thereby reducing the amount of wasted buffer space and network bandwidth. An additional desire is to specify the proper course of action when the EOP itself cannot be admitted and must also be dropped, and to improve network performance by reducing the likelihood of having to drop EOP cells.

SUMMARY OF THE INVENTION

A method consistent with the present invention for use in controlling congestion across a link in a network comprises the steps of determining if the end-of-packet cell of a preceding packet was discarded as a result of congestion and discarding all non-end-of-packet cells of one packet if the end-of-packet cell of the preceding packet is discarded as a result of congestion. This discard strategy is keyed to the admission of an end-of-packet cell—if an end-of-packet cell is discarded, then so are the all non-end-of packet cells of the next packet. Preferably, the rule is repeated until an end-of-packet cell is admitted.

Another method consistent with the present invention for use in controlling congestion across a link in a network comprises the steps of admitting cells into a buffer used by a connection, and discarding at least one non-end-of-packet cell of a packet as a result of congestion and discarding all non-end-of-packet cells of that packet not yet admitted into the buffer. The method further comprises determining whether the last cell admitted to the buffer from the connection is an end-of-packet cell, and discarding the end-of-packet cell of the packet if the last cell admitted to the buffer from the connection is an end-of-packet cell. Under this discard strategy, if the cell that is initially discarded happens to be the beginning of a packet, then that packet's end-of-packet cell can also be discarded.

Yet another method consistent with the present invention for use in controlling congestion across a link in a network comprises the steps of establishing a threshold within the buffer and a buffer end, the buffer space between the threshold and the end of the buffer being reserved for queuing of end-of-packet cells so as to reduce the likelihood of having to discard end-of-packet cells. The method further comprises determining, for each cell seeking admission into the buffer, whether the cell is an end-of-packet cell, and determining if the queue of cells already in the buffer has reached the threshold. The method also comprises discarding non-end-of-packet cells if the queue of cells already present in the buffer has reached the threshold, end-of-packet cells being discarded if the buffer space between the threshold and the end of the buffer is full.

Apparatus and networks are also provided for carrying out the methods consistent with the present invention.

The advantages accruing to the present invention are numerous. For example, by allowing for the EOP cells to be either admitted or discarded depending on the situation, congestion control and network performance are improved.

The above object and other objects, features, and advantages of the present invention will be readily appreciated by one of ordinary skill in the art from the following detailed description of the best mode for carrying out the invention when taken in connection with the accompanying drawings.

DETAILED DESCRIPTION OF THE PREFERRED IMPLEMENTATIONS

Figure 1:
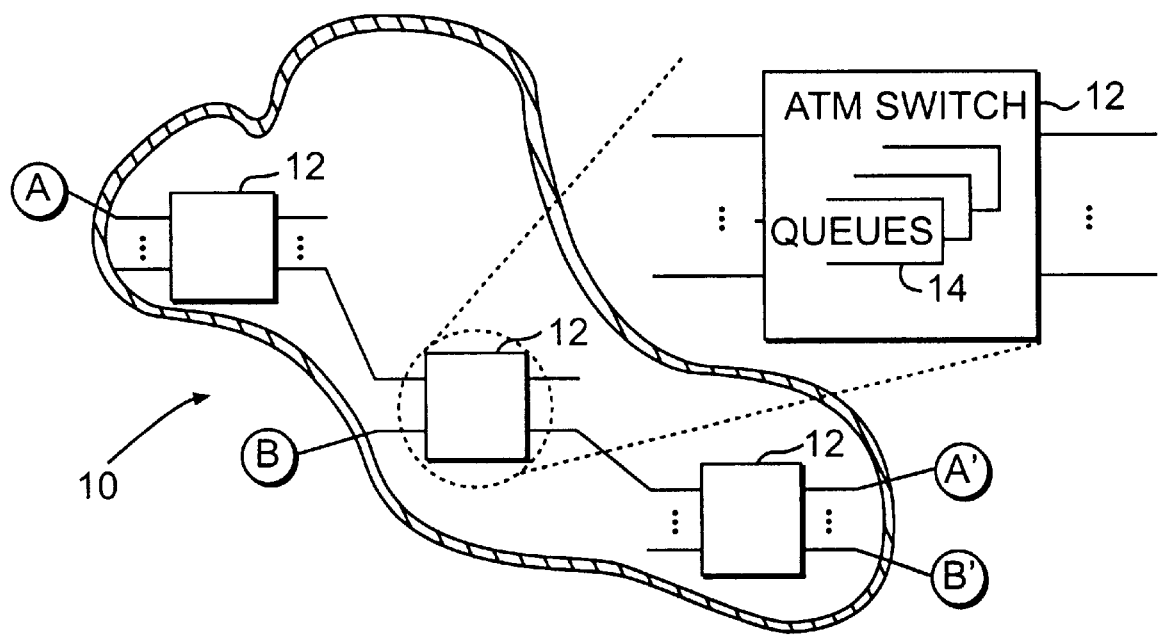
FIG. 1 is a high level block diagram of a network in which the enhanced partial packet discard scheme consistent with the present invention may be implemented.

FIG. 1 depicts a high level block diagram of a network, shown generally by reference numeral 10, within which the congestion control scheme consistent with the present invention may function. That scheme may be implemented with any switch or router that carries higher layer protocol units of data that have been broken into smaller units by a lower layer. A typical example of such a switch or router is ATM switch 12, which transmits packets or frames of data split into ATM cells for transmission over network 10.

As shown in FIG. 1, end systems or nodes A, B, A', and B' connect to the network and serve as the source and sink of network traffic. Although unidirectional connections are shown and are implied by the orientation of queues 14 in switch 12, the connections, A to A' and B to B' are typically bidirectional, and the systems consistent with the present invention may operate in both directions. The mapping of traffic to queues 14 is arbitrary. That is, a queue 14 may correspond to a single connection, a group of connections, or all connections. Switch 12 need not be of any particular architecture and, for example, may be input-buffered, output-buffered, or a hybrid.

Figure 2A:
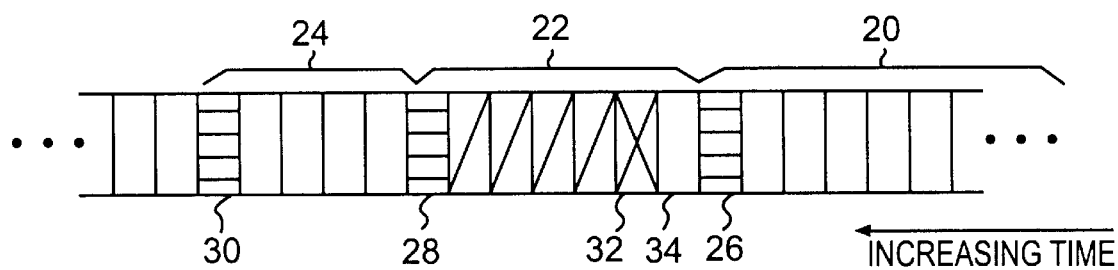
FIGS. 2a–2b are representations of streams of packets, shown in the order of transmission across a network link, illustrating operations consistent with the present invention.

FIG. 2A shows a representation of a stream of packets 20, 22, and 24 for a single connection in the order of transmission across a network link. Packets 20, 22, and 24 each comprise several cells demarcated by EOP cells 26, 28, and 30, respectively. Although the stream of packets/cells shown in FIG. 2A (and FIGS. 2B, 3A, and 3B) are from a single connection, they may have been interleaved with other connections' packets/cells. Enhanced partial packet discard consistent with the present invention is not restricted to single connection buffers.

During the transmission of packets 20, 22, and 24, an ATM switch (such as switch 12 of FIG. 1), becomes congested and must begin dropping cells. The first cell dropped is cell 32. For purposes of this discussion, the "X" in cell 32 indicates that cell was dropped for non-PPD purposes, i.e., insufficient buffer (queue) space. According to the known rules of partial packet discard, all remaining cells of packet 22 are also discarded, up to but excluding EOP cell 28. For purposes of this discussion, the "/" in the remaining cells of packet 22 indicates that those cells were dropped as a result of a PPD scheme. If the switch had discarded EOP cell 28, cell 34 of packet 22, which had not been discarded, would be "spliced" to and considered part of packet 24 by the AAL receiver.

Figure 2B:
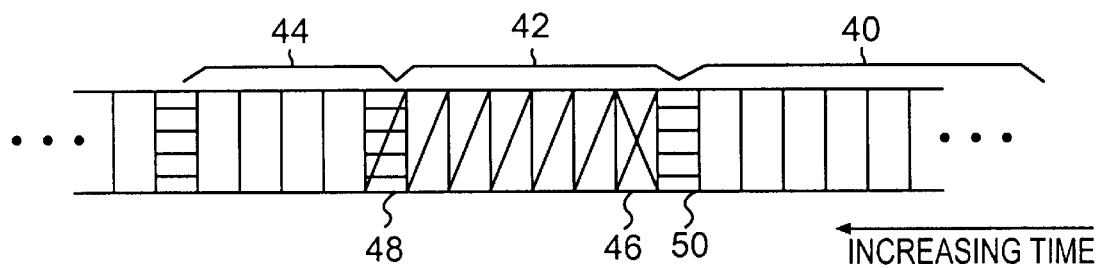

FIG. 2B, which shows a similar representation of a stream of packets 40, 42, and 44 in the order of their transmission across a network link, illustrates a performance improvement consistent with the present invention based on identifying when an EOP cell can, contrary to existing implementations of PPD, in fact be discarded. Systems and methods consistent with the present invention achieve this performance improvement by keeping track of whether or not the last cell admitted for the connection was an EOP cell. When an ATM switch has discarded one or more cells from a packet and is faced with an EOP cell, it too can be discarded if the last cell admitted to the queue was an EOP cell. As shown in FIG. 2B, upon congestion of the ATM switch during transmission of packets 40, 42, and 44, the switch begins discarding cells. The first cell dropped is cell 46. An external indication of congestion, such as shared buffer utilization or random early detection (RED), is the trigger for discarding cells for non-PPD reasons.

Since the first cell dropped was the beginning of a packet, the entire packet, up to and including the EOP cell 48, can be discarded without the risk of packet splicing. There is no chance for concatenating packets because the previous packet was properly terminated by the admission of EOP cell 50 as the last cell. The EOP discard rule of the present invention applies even if the first cell discarded is not the actual beginning of the packet but is instead presumed to be the beginning of the packet, since the real beginning may have been lost upstream.

Figure 3A:
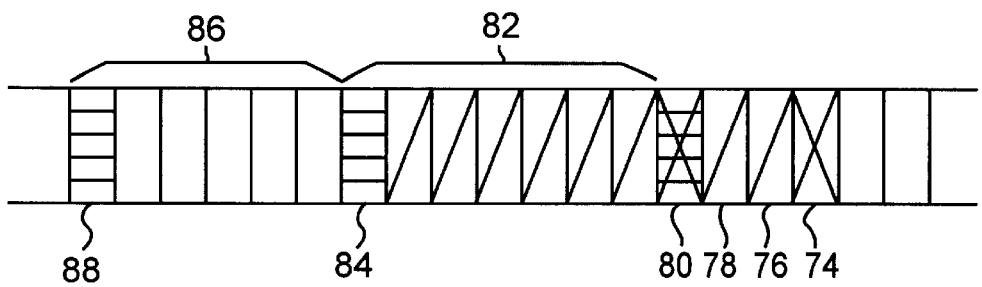
FIGS. 3a–3b are representations of a stream of packets, shown in the order of transmission across a network link, illustrating an additional operation consistent with the present invention.

FIG. 3A, which depicts a stream of packets in the order of transmission over a network link, illustrates another aspect consistent with the present invention preferably applicable to the situation wherein an EOP cell itself cannot be admitted and must be dropped due to "non-PPD" reasons, such as insufficient buffer (queue) space. A general rule consistent with the present invention is to discard all of the cells of the next packet up to, but excluding, that packet's EOP cell if the EOP cell of the preceding packet must be dropped. If that packet's EOP cell must also be dropped for non-PPD reasons, e.g., the buffer still lacks sufficient space to receive the EOP cell, the rule is reinvoked and all of the cells of the following packet up to, but excluding, the EOP cell are discarded. In the preferred embodiment, this discard scheme remains in place until an EOP cell is successfully admitted into the buffer.

To illustrate this aspect of the invention, cell 74 is, as shown in FIG. 3A, first discarded for non-PPD reasons. The balance of that packet, i.e., cells 76 and 78, are then dropped consistent with the present invention as described herein. Since cell 74 did not mark the beginning of a packet, the discard scheme consistent with present invention (also referred to herein as "PPD+") would prefer to have EOP cell 80 admitted to avoid splicing of packets. In this example, however, EOP cell 80 cannot be admitted because, for example, a buffer is full. As explained above, in this situation, systems and methods consistent with the present invention contemplate discarding the entire next packet—packet 82—up to but excluding EOP cell 84, which in this particular example need not be discarded for non-PPD reasons. Assuming, however, the congestion condition persisted and EOP cell 84 too was dropped for non-PPD reasons, the cells of packet 86 up to but excluding EOP cell 88 would have been dropped. This process preferably repeats until an EOP cell is admitted.

Figure 3B:

The initial premise of this rule is that PPD+ wished to admit EOP cell 80. This excludes, therefore, situations in which the EOP cell is to be discarded for PPD+ reasons, such as where the discarding of cells began at the start of a packet. Furthermore, as shown in FIG. 3B, this aspect of the present invention is not implicated in the case of a single cell packet i.e., a packet containing just an EOP cell. If the buffer is full, the single EOP cell will be discarded as shown, and PPD+ will not desire to admit it.

Figure 4:
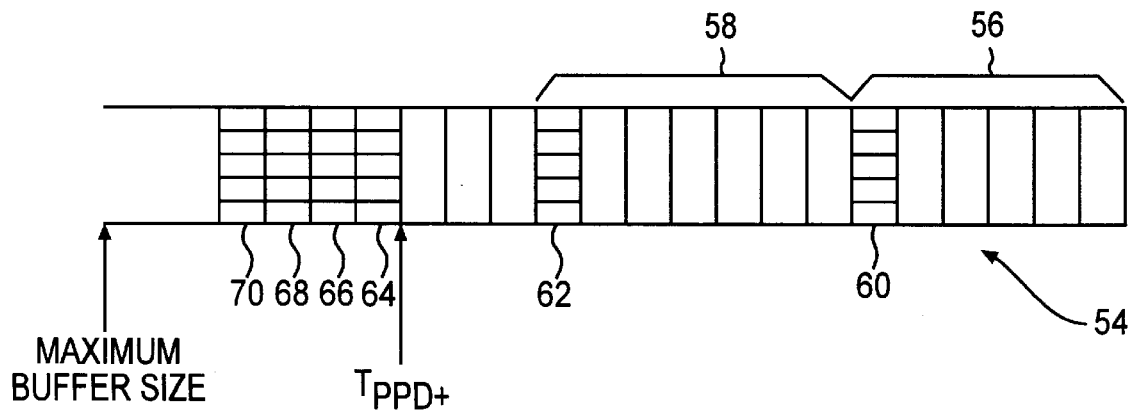
FIG. 4 is an illustration of a buffer configured to implement a further operation consistent with the present invention.

FIG. 4 shows a buffer configured consistent with the present invention for improving performance by reducing the likelihood of having to drop EOP cells. As shown, buffer 54 is configured to receive a plurality of packets 56 and 58 each demarcated by EOP cells 60 and 62, respectively. Although FIG. 4 shows buffer 54 holding only two packets, a buffer with an arbitrary fill capacity may also be used. The performance improvement associated with the present invention is achieved by specifying a threshold $T_{PPD+}$ near, but not at, the end of the buffer 54. In deciding whether to receive non-EOP cells into the buffer, this threshold is treated as the buffer size, and non-EOP cells are discarded once the buffer fill reaches the $T_{PPD+}$ threshold. As shown in FIG. 4, EOP cells such as EOP cells 64, 66, 68, and 70 will be admitted into buffer 54 even if the buffer fill has reached the $T_{PPD+}$ threshold. EOP cells thus need only be discarded when buffer 54 is truly full i.e., when there are cells all the way out to the point of buffer 54 labeled "maximum buffer size." Thus, by establishing the $T_{PPD+}$ threshold, an amount of buffer is effectively reserved for the exclusive use of EOP cells. This greatly improves the likelihood that EOP cells will be able to be admitted, thereby avoiding the displacement of packets/cells that results from having to discard EOP cells.

There is no set size for the EOP reserve in buffer 54. The amount of buffer space reserved for the exclusive use of EOP cells can be set based on a number of factors, including the number of connections and traffic characteristics which itself includes burstiness, packet length, buffer size, and correlation between connections. The $T_{PPD+}$ threshold can also vary dynamically depending on network traffic conditions or can be based on historical network traffic information. In this manner, the switch can anticipate expected increases in traffic and adjust the setting of the threshold accordingly, thereby further improving performance of the network in a proactive, rather than reactive, manner.

Figure 5:
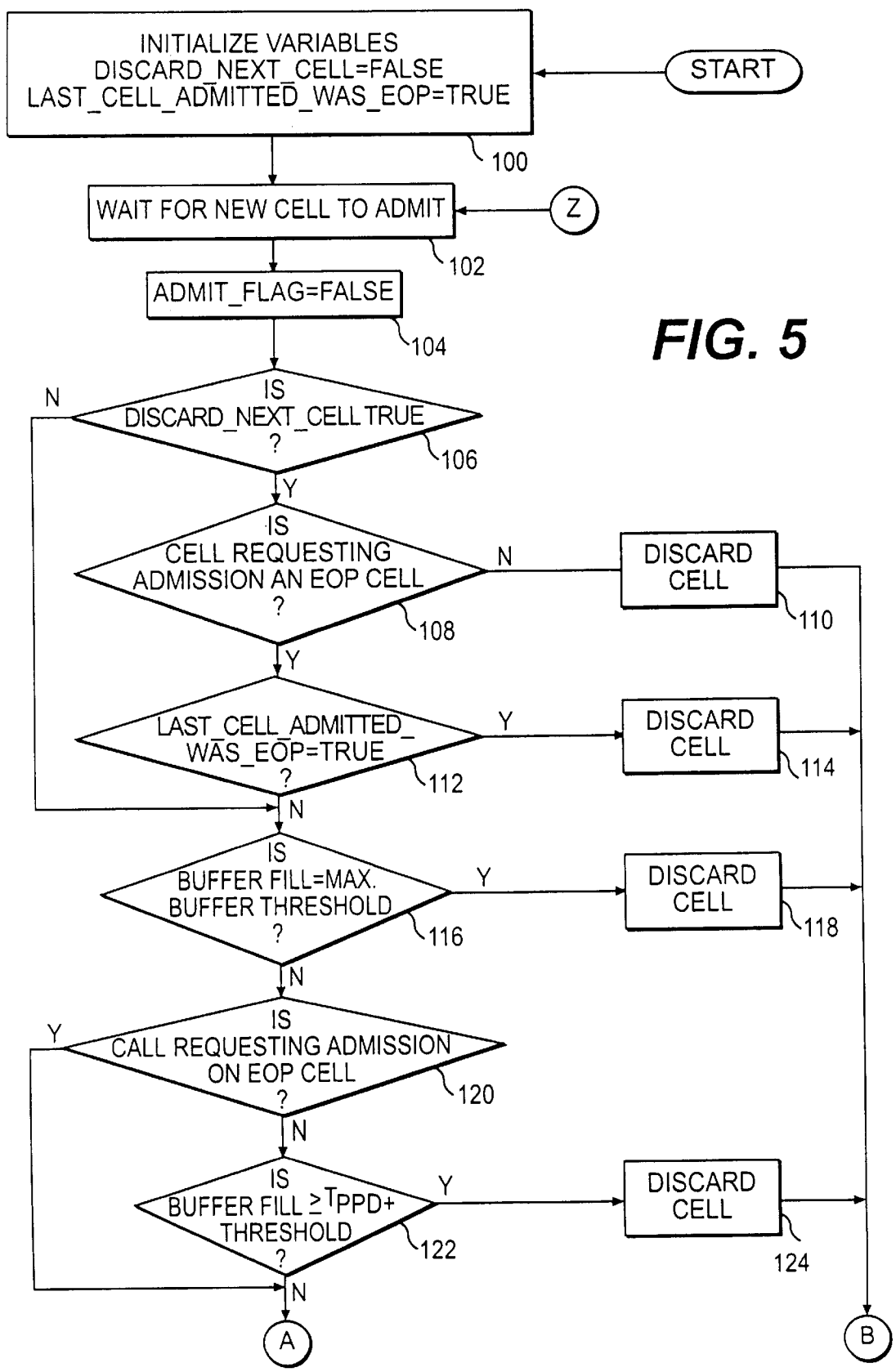
FIG. 5 is a flowchart detailing steps for a process consistent with the present invention.
Figure 5:
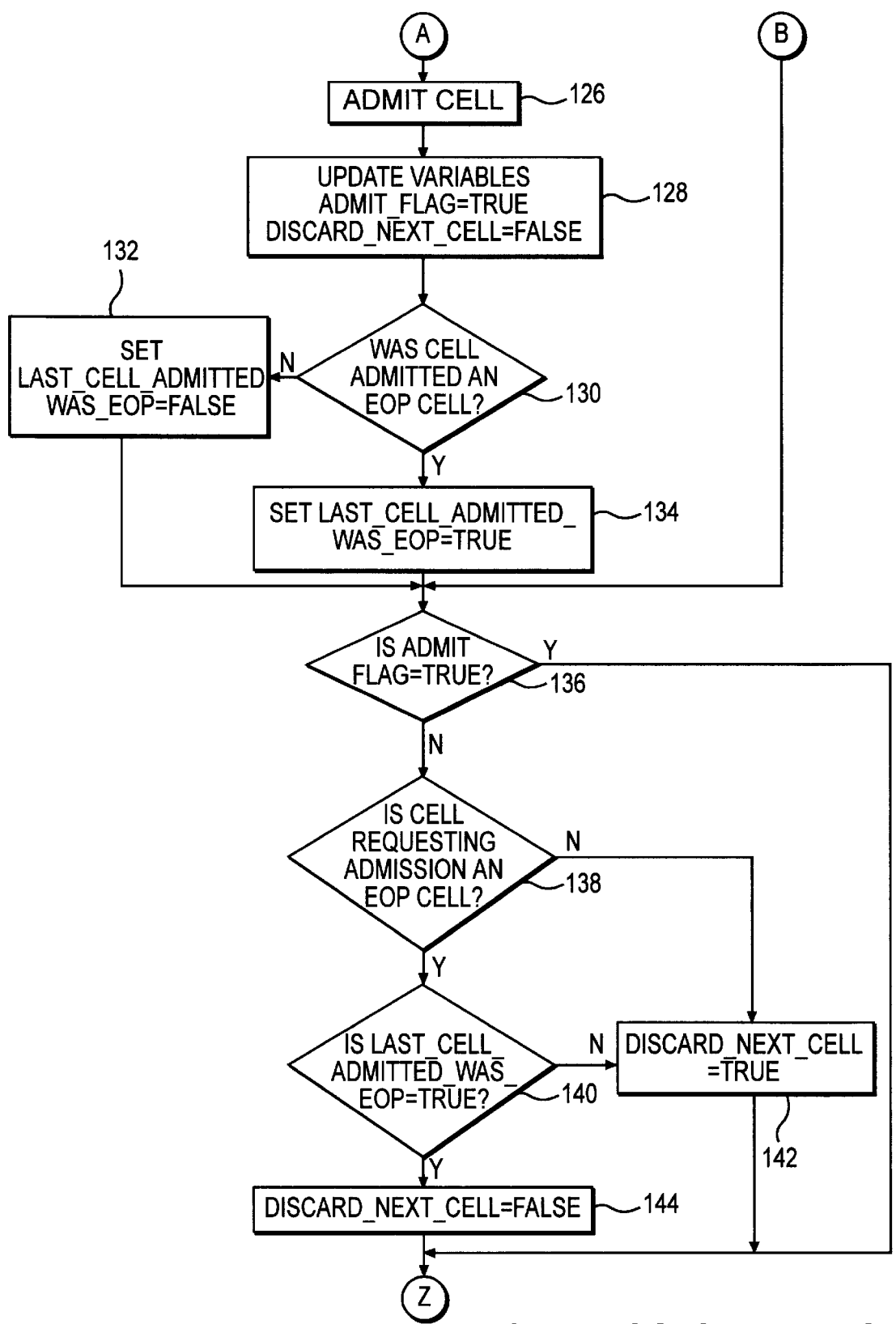

FIG. 5 shows a flowchart detailing the steps for one implementation of the partial packet discard strategy consistent with the present invention. The implementation may be described with reference to a state machine that has 2 bits of state per connection: DISCARD_NEXT_CELL and LAST_CELL_ADMITTED_WAS_EOP. At the outset, DISCARD_NEXT_CELL is set to FALSE (switch not in discard mode) and LAST_CELL_ADMITTED_WAS_EOP is set to true (presumes that the first cell to be admitted is the beginning of a packet) (step 100). Next, the ATM switch waits for a new cell to admit (step 102) and sets the ADMIT_FLAG to false (step 104). The state of the DISCARD_NEXT_CELL variable is checked (step 106), and if that variable is in a TRUE state, the switch determines whether the cell requesting admission is an EOP cell (step 108). If it is not an EOP cell, the cell is discarded (step 110). Otherwise, the state of the LAST_CELL_ADMITTED_WAS_EOP variable is checked (step 112). If that variable is TRUE, i.e., the last cell admitted was an EOP cell, then the cell requesting admission is discarded (step 114).

If the DISCARD_NEXT_CELL was not true (step 106), or if LAST_CELL_ADMITTED_WAS_EOP was not TRUE (step 112), non-PPD+ threshold checks are performed (step 116). This threshold check procedure preferably includes at least a determination of whether the buffer fill is equal to the maximum buffer threshold, i.e., is the buffer in which the requesting cell will be queued full? One of ordinary skill will appreciate that various other threshold/memory or discard checks, such as shared buffer utilization and random early detection (RED), may also be performed at this step. If a check indicates discard (e.g., if the buffer is full), the requesting cell is discarded (step 118). Otherwise, the switch checks whether or not the cell requesting admission is an EOP cell (step 120). If it is, there is no reason to perform a PPD+ threshold check and the cell can be admitted (step 126).

As FIG. 5 shows, if, however, the cell is a non-EOP cell, PPD+ threshold checks are performed (step 122). These checks entail checking the buffer to determine whether not queued cells (i.e., the buffer fill) have reached the $T_{PPD+}$ threshold. If so, the non-EOP cell cannot be admitted and is discarded (step 124). Otherwise, the non-EOP cell can be admitted to the buffer (step 126).

Next, various flags are updated to reflect the admission of the cell to the buffer (step 128). The ADMIT_FLAG is set to TRUE, and the DISCARD_NEXT_CELL is set to FALSE (exit discard mode). At this point, the switch checks the nature of the cell just admitted (step 130) and sets the LAST_CELL_ADMITTED_WAS_EOP variable to the appropriate state (steps 132 and 134). The next step, the step that follows the discarding of the new cell (steps 110, 114, 118, and 124), is for the switch to check the state of the ADMIT_FLAG (step 136). If it is TRUE, control flow returns to waiting for the new cell to admit (step 102).

If the new cell was not admitted, i.e., was discarded, the ADMIT_FLAG variable has remained false (see step 104) and control proceeds to the logic for determining the next state of the DISCARD_NEXT_CELL variable. If the cell that was denied admission was not an EOP cell (step 138), then the next cell should be discarded, and the DISCARD_NEXT_CELL variable is set to TRUE (step 142). Thereafter, control returns to waiting for a new cell to admit (step 102).

If the last cell denied admission was an EOP cell, the discard mode can be exited only if the last cell admitted was an end-of-packet cell (step 140). If so, the DISCARD_NEXT_CELL variable is set to FALSE (step 144), the discard mode is exited, and flow proceeds to waiting for a new cell (step 102). The next cell will be admitted if the threshold checks pass (steps 106–126).

It will be apparent to those skilled in this art that various modifications and variations can be made to the enhanced partial packet discard strategy consistent with the present invention without departing from the spirit and scope of the invention. Other embodiments will be apparent to those skilled in this art from consideration of the specification and practice of the strategy disclosed herein. The specification and examples be considered exemplary only, with a true scope and spirit of the invention being indicated by the following claims.

We claim:

1. A method for controlling congestion across a link in a network, the network including at least one switch having at least one buffer for receiving cells transmitted over the network in packets, each packet including at least an end-of-packet cell, the method comprising the steps, performed by the switch, of: determining whether the end-of-packet cell of a first packet had been discarded as a result of congestion; and discarding all non-end-of-packet cells of a second packet if the end-of-packet cell of the first packet had been discarded as a result of congestion.

2. The method of claim 1 further comprising the step of discarding all non-end-of-packet cells of each subsequent packet if the end-of-packet cell for the preceding packet was discarded as a result of congestion.

3. A method, for use in controlling congestion across a link in a network including at least one switch having at least one buffer for receiving cells transmitted over the network in packets, each packet including at least an end-of-packet cell, the method comprising the steps, performed by the switch, of:

discarding a non-end-of-packet cell of a first packet as a result of congestion;

discarding any remaining non-end-of-packet cells of the first packet;

discarding the end-of-packet cell of the first packet as a result of congestion; and discarding all non-end-of-packet cells of a second packet transmitted immediately following the first packet.

4. The method of claim 3 further comprising the step of discarding all non-end-of-packet cells in any given packet if the end-of-packet cell of the packet immediately preceding the given packet had been discarded as a result of congestion.

5. An apparatus for controlling congestion across a link in a network, the network including at least one switch having at least one buffer for receiving cells transmitted over the network in packets, each packet including at least an end-of-packet cell, the apparatus comprising: means for determining whether the end-of-packet cell of a first packet had been discarded as a result of congestion; and means for discarding all non-end-of-packet cells of a second packet if the end-of-packet cell of the first packet had been discarded as a result of congestion.

6. The apparatus of claim 5 further comprising means for discarding all non-end-of-packet cells of each subsequent packet if the end-of-packet cell for the preceding packet was discarded as a result of congestion.

7. An apparatus, for use in controlling congestion across a link in a network including at least one switch having at least one buffer for receiving cells transmitted over the network in packets, each packet including at least an end-of-packet cell, the apparatus comprising:

means for discarding a non-end-of-packet cell of a first packet as a result of congestion;

means for discarding any remaining non-end-of-packet cells of the first packet;

means for discarding the end-of-packet cell of the first packet as a result of congestion; and means for discarding all non-end-of-packet cells of a second packet transmitted immediately following the first packet.

8. The apparatus of claim 7 wherein the means for discarding discards all non-end-of-packet cells in any given packet if the end-of-packet cell of the packet immediately preceding the given packet is discarded as a result of congestion.

9. A method for controlling congestion across a link in a network, the network including at least one switch having at least one buffer used by a connection for receiving cells transmitted over the network in packets, each packet including at least an end-of-packet cell, the method comprising the steps of:

admitting cells into the buffer;

discarding at least one non-end-of-packet cell of a packet as a result of congestion;

discarding all non-end-of-packet cells of the packet not yet admitted into the buffer for the connection;

determining whether the last cell admitted to the buffer for the connection is an end-of-packet cell; and discarding the end-of-packet cell of the packet if the last cell admitted to the buffer for the connection is an end-of-packet cell.

10. An apparatus for controlling congestion across a link in a network, the network including at least one switch having at least one buffer used by a connection for receiving cells transmitted over the network in packets, each packet including at least an end-of-packet cell, the apparatus comprising:

means for discarding at least one non-end-of-packet cell of a packet as a result of congestion;

means for discarding all remaining non-end-of-packet cells of the packet not yet admitted into the buffer for the connection;

means for determining whether the last cell admitted to the buffer for the connection is an end-of-packet cell; and means for discarding the end-of-packet cell of the packet if the last cell admitted to the buffer for the connection is an end-of-packet cell.

11. A method for controlling congestion across a link in a network, the network including at least one switch having at least one buffer for receiving cells transmitted over the network in packets, each packet including at least an end-of-packet cell, the method comprising the steps of:

establishing a threshold within the buffer and a buffer end; and admitting cells into the buffer, the buffer space between the threshold and the end of the buffer reserved for queuing end-of-packet cells so as to reduce the likelihood of having to discard end-of-packet cells.

12. The method of claim 11 wherein the position of the threshold within the buffer varies dynamically based on network traffic conditions.

13. The method of claim 11 wherein the position of the threshold within the buffer varies based on historical network traffic information.

14. The method of claim 11 further comprising:

determining, for each cell seeking admission into the buffer, whether the cell is an end-of-packet cell;

determining if the queue of cells already in the buffer has reached the threshold; and discarding non-end-of-packet cells if the queue of cells already present in the buffer has reached the threshold, end-of-packet cells being discarded if the buffer space between the threshold and the end of the buffer is full.

15. An apparatus for controlling congestion across a link in a network, the network including at least one switch having at least one buffer for receiving cells transmitted over the network in packets, each packet including at least an end-of-packet cell, the apparatus comprising: a buffer configured to include a threshold and an end, the buffer space between the threshold and the end of the buffer reserved for queuing end-of-packet cells so as to reduce the likelihood of having to discard end-of-packet cells.

16. The apparatus of claim 15 wherein the position of the threshold within the buffer varies dynamically based on network traffic conditions.

17. The apparatus of claim 15 wherein the position of the threshold within the buffer varies based on historical network traffic information.

18. The apparatus of claim 15 further comprising:

means for determining, for each cell seeking admission into the buffer, whether the cell is an end-of-packet cell;

means for determining if the queue of cells already in the buffer has reached the threshold; and means for discarding non-end-of-packet cells if the queue of cells already present in the buffer has reached the threshold, end-of-packet cells being discarded if the buffer space between the threshold and the end of the buffer is full.

19. A communications network comprising:

a plurality of nodes sending and receiving packets of cells, each packet including at least an end-of-packet cell; and a switch interconnecting the nodes, the switch including means for discarding cells as a result of congestion, means for determining whether an end-of-packet cell of a first packet had been discarded as a result of congestion, and means for discarding all non-end-of-packet cells of a second packet if the end-of-packet cell of the first packet had been discarded as a result of congestion.

20. A communications network comprising:

a plurality of nodes sending and receiving packets of cells, each packet including at least an end-of-packet cell; and a switch interconnecting the nodes, the switch including a buffer used by a connection,
- means for discarding at least one non-end-of-packet cell of a packet as a result of congestion,
- means for discarding all non-end-of-packet cells of the packet not yet admitted into the buffer for the connection,
- means for determining whether the last cell admitted to the buffer for the connection is an end-of-packet cell, and
- means for discarding the end-of-packet cell of the packet if the last cell admitted to the buffer for the connection is an end-of-packet cell.

21. A communications network comprising:

a plurality of nodes sending and receiving packets of cells, each packet including at least an end-of-packet cell;

a switch interconnecting the nodes, the switch including a buffer, the buffer configured to include a threshold and an end, the buffer space between the threshold and the end of the buffer reserved for queuing end-of-packet cells so as to reduce the likelihood of having to discard end-of-packet cells.

* * * * *